F. R. SOMMERMEYER.
SPROCKET FOR MOVING PICTURE FILMS.
APPLICATION FILED FEB. 12, 1918.
1,361,919. Patented Dec. 14, 1920.
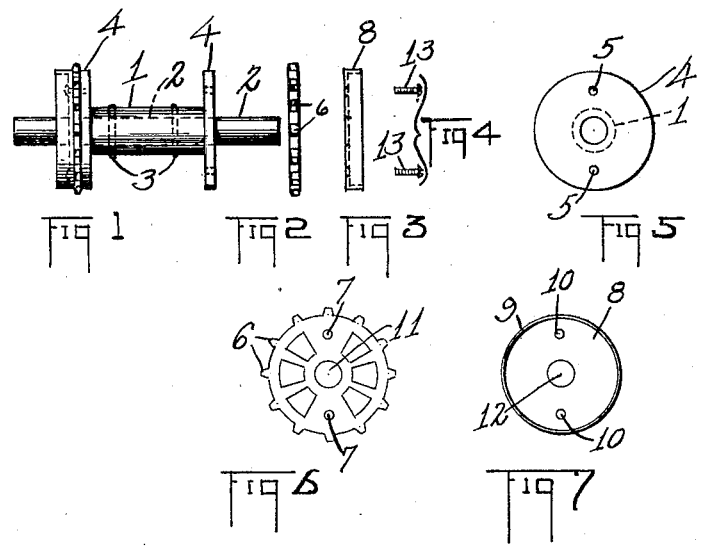
Inventor
FRANK R. SOMMERMEYER.

UNITED STATES PATENT OFFICE.

FRANK R. SOMMERMEYER, OF SPRING LAKE, MICHIGAN.

SPROCKET FOR MOVING-PICTURE FILMS.

1,361,919. Specification of Letters Patent. Patented Dec. 14, 1920.

Application filed February 12, 1918. Serial No. 216,766.

*To all whom it may concern:*

Be it known that I, FRANK R. SOMMERMEYER, a citizen of the United States, residing at Spring Lake, county of Ottawa, State of Michigan, have invented a certain new and useful Improvement in Sprockets for Moving-Picture Films, and declare the following to be a full, clear, and exact description of the same, such as will enable others skilled in the art to which it pertains to make and use the same, reference being had to the accompanying drawings, which form a part of this specification.

This invention relates to sprocket wheels such as are commonly used in motion picture projecting machines and cameras for propelling of the film through the machine. The usual sprocket wheel used in machines of this character is one having a flanged hub with teeth formed on the hub portion. It is vitally important that the sprockets be absolutely true in the spacing of the teeth, and with sprocket wheels for this purpose the teeth become worn after sufficient use to cause the film to move out of alinement with the focusing lens, and even such slight wear as to cause one-hundredth part of an inch relative to displacement of the film will cause approximately a two-inch jump or flicker on the screen. The sprocket, of course, wears at a point contacting the film when the film is being propelled, and it is at this particular point that practically all of the wear occurs, and when sprocket teeth of the type above described become worn the entire hub and integral parts therewith must be replaced.

The object of this invention is to provide a sprocket wheel with removable toothed portions and removable flanges so that when the teeth become worn or out of alinement the toothed portions thereof may be replaced by new portions without necessity of discarding the entire hub and integral parts. It is thus an object of the invention to provide a sprocket wheel in which the cost of replacing the sprockets is reduced to a minimum.

These and other objects and the several novel features of the invention in its preferred form are hereinafter more clearly described and claimed and shown in the accompanying drawings in which—

Figure 1 shows my improved hub with the sprocket and flange in assembled relation on one end thereof.

Fig. 2 is an elevation of a sprocket removed from the hub.

Fig. 3 is an elevation of a flange removed from the sprocket.

Fig. 4 shows the screws for assembling the sprocket and flange on the hub.

Fig. 5 is an end elevation of the hub.

Fig. 6 is a side view of the sprocket.

Fig. 7 is an elevation of one of the flanges.

Similar characters refer to similar parts throughout the drawings and specification.

In the device as shown in Fig. 1, a hub portion 1 is provided tubular in form fitting the usual shaft indicated by dotted lines 2 to which the hub is secured as by pins indicated at 3 or in any other approved manner. This hub 1 is provided with two flange ends 4, 4 shown in side elevation in Fig. 5. This flange is provided with two oppositely disposed threaded apertures 5, 5. A sprocket to be used in conjunction with the hub is shown in side elevation in Fig. 6 having the peripheral teeth 6 which project beyond the flange 4 when assembled therewith as will be understood from Fig. 1. This sprocket is provided with apertures 7 registering with the apertures 5 of the flange 4. The sprocket teeth are of the same number and size as in the wheels ordinarily utilized for this purpose to fit standard films.

A cupped plate or flange member 8 is also utilized as shown in edge view in Fig. 3, and in side elevation in Fig. 7, the plate having a circumferential flange 9 and being provided with oppositely disposed apertures 10 registering with the apertures 7 of the sprocket wheel, and apertures 5 of the hub flange 4. The sprocket wheel has a central aperture 11 and the flange member 8 has a central aperture 12 of sufficent size to readily fit over the shaft to which the hub is secured and in assembling the sprocket wheel is placed on the shaft in contact with the flange 4 with the apertures 7 in registration with the threaded apertures 5, and the cupped plate or flange member 8 is placed in contact with the sprocket wheel with the apertures 10 in registration with the apertures 7 whereupon the screws 13 are inserted and screwed into the flange 4 thus holding the parts securely together in a manner indicated at the left side of Fig. 1.

The sprocket members are similar in form and so assembled that the teeth of the sprocket on one end are in alinement with the teeth of the sprocket on the other end of the hub member 1, and it will be readily understood from the above description that if the teeth of either or both of the sprockets have become worn the sprockets may be readily replaced without necessity of replacing the other portions of the hub member and flange members which do not become worn in use and, therefore, replacement thereof is wholly unnecessary. By this arrangement replacement of worn sprocket wheels is simplified and the expense thereof is reduced to a minimum. By making the flange 4 of the usual width between the teeth and inner face of the flange, as in the former type of sprocket wheels, and the flange 9 of a width equal to the width of the former sprocket wheel flange between the teeth and the outer face thereof, a bearing is provided for the film on the said flanges allowing the teeth of the sprocket to project through the apertures of the film as will be readily understood. By providing a flanged hub member as shown having an aperture registering with an aperture in the shaft, the hub member is assembled in a specific relationship with the shaft and by attaching the sprockets and outer flanges to the respective flanges of the hubs possibility of the sprockets becoming displaced relative to each other is avoided and the whole may be assembled or disassembled as a unit and always replaced on the shaft in the identical position originally occupied thereby.

Having thus briefly described my invention, its utility and mode of operation, what I claim and desire to secure by Letters Patent of the United States is—

1. A sprocket for operating films of motion picture machines comprising the combination with a shaft, of a hub member attachable directly to the shaft, the hub member having a circular flange at each end, a sprocket wheel for each flange of the same diameter as the flange and having teeth projecting beyond the periphery thereof, a retaining plate having a face of a width to support the edge of the film secured directly to each flange and securing the sprocket thereon, the parts when assembled forming a unit attachable to the shaft in assembled relation.

2. A sprocket for operating films of motion picture machines comprising a shaft provided with an aperture therethrough, a hub member having an aperture to register with the shaft aperture, a pin for securing the same together and positioning the said hub member longitudinally of the shaft, the hub member having a circular flange at each end, a flat sprocket wheel for each flange, the sprocket wheels being secured to the respective flanges with the teeth thereof in alinement, a retaining plate having a face of a width substantially equal to that of the flange and forming therewith a support for the film on each side of the sprocket wheel, and means for securing each plate and sprocket directly to its respective flange, the assembled parts being attachable to or detachable from the shaft as a unit.

In testimony whereof, I sign this specification.

FRANK R. SOMMERMEYER.